UNITED STATES PATENT OFFICE.

MAGNUS A. GOLTZ, OF WINONA, MINNESOTA.

RECOVERY OF THORIUM.

1,322,185.     Specification of Letters Patent.     Patented Nov. 18, 1919.

No Drawing.     Application filed February 28, 1917. Serial No. 151,527.

*To all whom it may concern:*

Be it known that I, MAGNUS A. GOLTZ, a citizen of the United States, residing at Winona, county of Winona, and State of Minnesota, have invented certain new and useful Improvements in the Recovery of Thorium; and I do hereby declare the following to be a full, clear, and exact description of the invention, such as will enable others skilled in the art to which it appertains to make and use the same.

This invention relates to the separation and recovery of thorium as pyrophosphate from monazite sand.

The invention is based upon the discovery that thorium can be selectively precipitated as pyrophosphate directly from the sulfuric acid solution resulting from the decomposition of monazite sand by concentrated sulfuric acid, without the addition of a soluble pyrophosphate, such as pyrophosphoric acid or an alkaline pyrophosphate. This is effected by producing from the ortho-phosphoric acid in the decomposition product of the sand, the necessary pyrophosphoric acid for precipitating the thorium; I have found that by carrying out the decomposition of monazite sand with concentrated sulfuric acid at a sufficiently high temperature, or by heating the mass resulting from the decomposition of the sand with sulfuric acid, and by removing water from the orthoprosphoric acid set free during the decomposition, it is possible to convert this orthophosphoric acid into pyrophosphoric acid. There is thereby produced within and added to the mass sufficient pyrophosphoric acid to replace the soluble pyrophosphate, which it would otherwise be necessary to add to precipitate the thorium as pyrophosphate.

When the pyrophosphoric acid has been thus formed within the mass, the precipitation of the thorium as pyrophosphate can be readily effected by introducing the mass containing the pyrophosphoric acid so formed into water.

With an acid solution, such as is thus obtained, the other rare earths which form soluble pyrophosphates are retained in solution, so that the precipitated thorium pyrophosphate with small amounts of accompanying impurities can be readily separated as by decantation, filtration or otherwise.

In order to convert the orthophosphoric acid set free when monazite sand is decomposed by concentrated sulfuric acid (oil or vitriol) into pyrophosphoric acid, it is necessary to heat to a temperature considerably in excess of that commonly used in the decomposition of monazite sand with such sulfuric acid. This temperature should be sufficient to result in the removal of water, usually with considerable amounts of sulfuric acid. Such high temperatures can be maintained during the decomposition of the sand so that the water will be progressively and gradually removed, or the decomposition product obtained at lower temperatures can, at or near the end of the decomposition, be heated sufficiently to cause the desired removal of water and accompanying sulfuric acid.

In order to accomplish the formation of the pyrophosphoric acid in relatively short time intervals it is usually necessary to heat to practically the boiling point of sulfuric acid so that sulfuric acid fumes as well as water vapor are removed. If the sulfuric acid, however, is sufficiently strong at the outset it may not be necessary to remove any further amounts of water. That is to say, in order to convert the orthophosphoric acid into the pyrophosphoric acid, it is necessary, as is known, that two molecules of the orthophosphoric acid should be com-combined with the elimination of one molecule of water. If the sulfuric acid used is of sufficient strength to effect this removal of water from the orthophosphoric acid, further concentration may not be necessary; but with the oil of vitriol commonly used for the decomposition of monazite, further concentration and removal of water is necessary. In any event it is necessary to heat the mass to a sufficient temperature and under proper conditions for the conversion of the orthophosphoric acid into pyrophosphoric acid.

It is known that orthophosphoric acid can be converted into pyrophosphoric acid by heating to a temperature sufficient to remove water, but this temperature is much lower (around 215° C.) than that required according to the process of the present invention. It is also known, prior to my invention that thorium could be selectively precipitated from the acid solution obtained by the decomposition of monazite sand with sulfuric acid by adding thereto a soluble pyrophosphate such as pyrophosphoric acid or its soluble salts.

According to the present invention, the production of pyrophosphoric acid from orthophosphoric acid, and the selective precipitation of thorium as pyrophosphate directly from the sulfuric acid decomposition product of monazite sand, is effected in a particularly advantageous manner in that the pyrophosphoric acid precipitant is produced directly from the combined phosphoric acid present in the monazite sand and set free during the decomposition. There is accordingly produced within the decomposition product, as an incident to the decomposition, the necessary soluble pyrophosphate precipitating agent which would otherwise require to be separately produced and added.

If all of the orthophosphoric acid set free from the monazite sand during its decomposition is converted into pyrophosphoric acid, there will be produced a considerable excess of the pyrophosphoric acid over and above what is necessary for the selective precipitation of the thorium. This is advantageous in that it results in a more complete precipitation of the thorium. Moreover, larger amounts of the pyrophosphoric acid can be thus produced in practice than would be feasible to add in the form of a soluble pyrophosphate, such as pyrophosphoric acid or its soluble salts, otherwise produced.

It will accordingly be seen that the process is one of notable economy and simplicity, involving, as it does, the production of the pyrophosphoric acid directly from the constituents of the sand itself, by heating the acid decomposition product of the sand, and by utilizing directly the pyrophosphoric acid thus produced for the selective precipitation of the thorium.

The precipitate of thorium pyrophosphate can be further purified or treated in any desired or suitable manner.

Inasmuch as thorium pyrophosphate is obtained directly in a high state of purity, relatively little further purification is usually necessary.

I claim:

1. The method of effecting the selective separation of thorium from monazite sand as thorium pyrophosphate, which comprises decomposing the sand with sulfuric acid and heating to a sufficient temperature to convert the orthophosphoric acid set free from the sand into pyrophosphoric acid, and precipitating the thorium as pyrophosphate with the pyrophosphoric acid thus produced, by mixing the decomposition product with water.

2. The method of effecting the selective separation of thorium from monazite sand as thorium pyrophosphate, which comprises decomposing the sand with sulfuric acid, converting the orthophosphoric acid set free from the sand into pyrophosphoric acid, and precipitating the thorium as pyrophosphate with the pyrophosphoric acid thus produced.

3. The method of effecting the selective separation of thorium from monazite sand as thorium pyrophosphate, which comprises decomposing the sand with concentrated sulfuric acid and heating to a temperature sufficient to remove water and to convert the orthophosphoric acid set free from the sand into pyrophosphoric acid, and precipitating the thorium as pyrophosphate with the pyrophosphoric acid thus produced by adding the decomposition product to water.

4. The method of effecting the selective separation of thorium from monazite sand as thorium pyrophosphate, which comprises decomposing the sand with sulfuric acid, heating the decomposition product of the sand to a temperature sufficient to produce pyrophosphoric acid therein, and precipitating the thorium as pyrophosphate with the pyrophosphoric acid thus produced.

In testimony whereof I affix my signature.

MAGNUS A. GOLTZ.